United States Patent [19]

Kemper et al.

[11] 3,725,860

[45] Apr. 3, 1973

[54] PROCESS AND CIRCUIT ARRANGEMENT FOR THE MEASURING OF THE FREQUENCY OF BIT ERROS AND BLOCK ERRORS WITH OPTIONAL BLOCK LENGTH IN THE TRANSMISSION OF BINARY CODED DATA CHARACTERS

[75] Inventors: Jürgen Kemper, Zurich, Switzerland; Erwin Schenk, Munich, Germany

[73] Assignee: Siemens Aktiengesellschaft, Berlin and Munich, Germany

[22] Filed: Apr. 20, 1971

[21] Appl. No.: 135,645

[30] Foreign Application Priority Data

Apr. 29, 1970 Germany....................P 20 21 098.4

[52] U.S. Cl.....................340/146.1 AX, 340/146.1 E

[51] Int. Cl.............................................G08c 25/00

[58] Field of Search............ 340/146.1 AX, 146.1 D, 340/146.1 E, 172.5

[56] References Cited

UNITED STATES PATENTS

| | | | |
|---|---|---|---|
| 3,069,498 | 12/1962 | Frank | 340/146.1 |
| 3,491,338 | 1/1970 | Malloy | 340/146.1 |
| 3,496,536 | 2/1970 | Wheeler | 340/146.1 |
| 3,562,710 | 2/1971 | Halleck | 340/146.1 |
| 3,596,245 | 7/1971 | Finnie et al. | 340/146.1 |

*Primary Examiner*—Charles E. Atkinson
*Attorney*—Harold J. Birch et al.

[57] ABSTRACT

A process and apparatus are described for measuring the frequency of bit errors and block errors with optional block length in the transmission of binary coded data characters, in which at the sending station, a certain test text with fixed text cycle length is sent out and in which the error measurement takes place at a receiving station.

4 Claims, 2 Drawing Figures

PROCESS AND CIRCUIT ARRANGEMENT FOR THE MEASURING OF THE FREQUENCY OF BIT ERROS AND BLOCK ERRORS WITH OPTIONAL BLOCK LENGTH IN THE TRANSMISSION OF BINARY CODED DATA CHARACTERS

BACKGROUND OF THE INVENTION

In the transmission of data it is necessary to carry out, besides the measurement of distortion, measurements of the frequency of errors in order to be able to determine the quality of a transmission system with respect to the transmission apparatus utilized and to the transmission path. For this reason, the frequency of bit errors and the frequency of block errors are determined. In the measurement of the frequency of bit errors each bit recognized as false by the measuring receiver is counted, and the sum of the false bits is related to the number of the total bits. The frequency of block errors is determined fundamentally in the same manner, only instead of the individual bit, blocks having a large number of bits are evaluated.

For the measurements of error frequency, a standardized test text having a fixed cycle length is recommended on the international level by the Comite Consultatif International Telegraphique et Telephonique (CCITT). This so-called pseudo-random text has a length of 511 bits ($2^9-1$ bits) and is formed with the help of a nine stage, feedback coupled shift register. The text given out by the shift register, which consists of binary steps, possesses a known sequence of the individual steps (CCITT recommendation V51, V52 and V53, October 1968).

The simplest solution of the measurement of the frequency of block errors results with the standard 511 bit test text, when one selects a block length of 511 bits. In practical operation, however, in data transmission systems, different block lengths are used. It is, therefore, necessary for the measurement of the quality of a transmission system to carry out the measurement of the frequency of errors with different block lengths.

It is, therefore, an object of the invention to provide a process and apparatus for the quality measurement of data transmission systems which permit the frequency of block errors to be determined with different block lengths of transmitted information.

SUMMARY OF THE INVENTION

The solution of the problem consists therein that at the receiver, the specified test text with the fixed text cycle length is created with the help of a multiple stage, shift register having feedback and controlled by step time signals. A synchronization device brings the test created in the receiver in phase with the received text, and the individual steps are successively compared in a comparator. At the appearance of an error in the comparison, an error impulse is given off to a switching device and to a gate. A binary counter, which is adjustable to the desired block length, is controlled by step time signals and by output timing of the shift register. A control stage is provided for the starting and stopping of the error frequency measurement, which control stage fixes the exact starting and stopping of the measurement operation bit and block error frequency measurement. The output of the binary counter controls the gate over the switching device, and the bit and block errors are determined at the output of the gate.

The process makes it possible to determine the frequency of block errors with a series of block lengths graduated according to powers of two. Thereby, it is possible, in a simple manner, to measure the frequency of bit errors as well as the frequency of block errors. The process possesses a simple and rapid synchronization. The process uses a built in timing generator, which is count-stabilized. In operation with external step timing signals, for example, from a modem, error frequency measurements are possible on data transmission systems which work with speeds over 10 kBd. It is possible to adjust block lengths which are larger than the maximum cycle of the random text.

BRIEF DESCRIPTION OF THE DRAWINGS

The invention will be best understood by reference to a description given hereinbelow of a preferred form according to its principles in conjunction with the drawings in which.

DETAILED DESCRIPTION OF THE DRAWINGS

Figure 1:
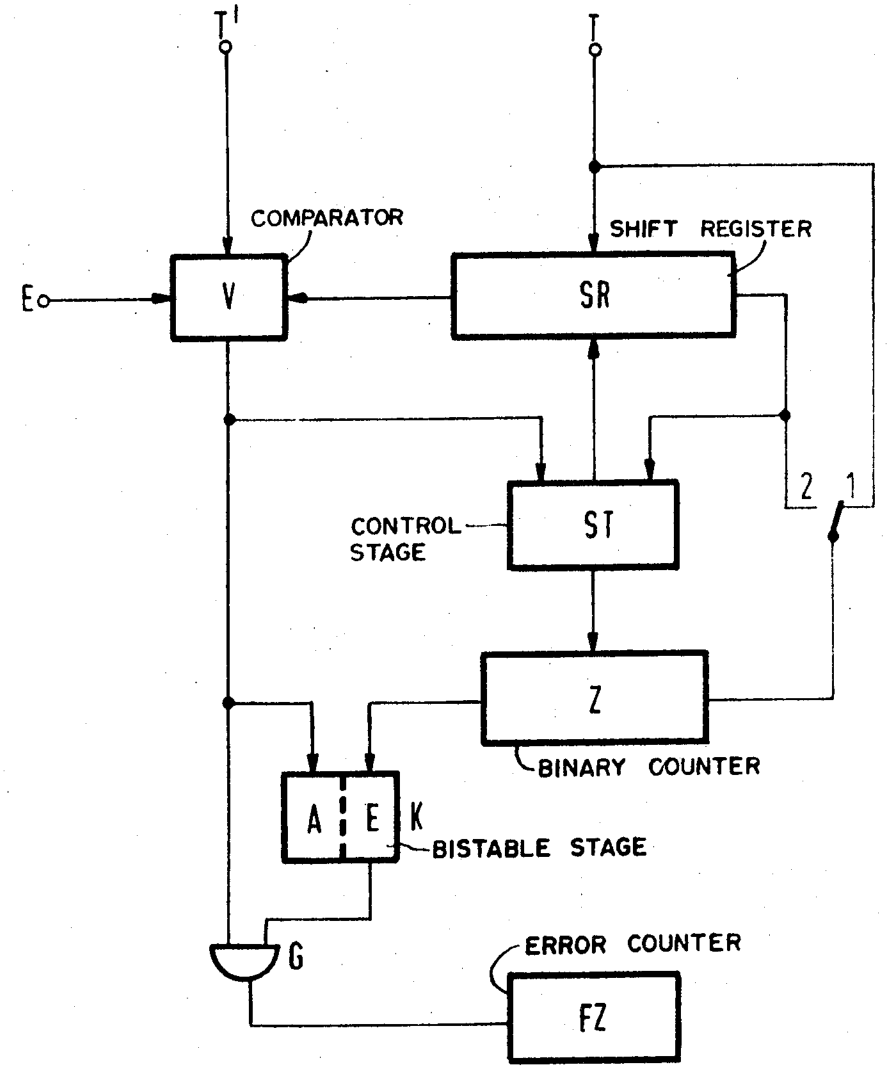
FIG. 1 is a block circuit diagram of a preferred arrangement for performing the inventive process.

FIG. 1 shows the block circuit diagram for the measurement of the frequency of block errors using different block lengths. The nine stage shift register SR generates, for example, the standardized test text with a maximum cycle of 511 bits ($2^9-1$ bits). With the help of an additional binary counter Z, whose counter capacity is adjustable, different block lengths can be set. The data characters received by the receiver arrive at input E at the comparator V. A test text equivalent to that sent out by the sender is generated in the shift register SR. The shift register is advanced by the step time signal T which is derived from a count-stabilized oscillator. The step time signal T', which controls the comparator, is derived from the step time signal T and merely displaced in time by 180° in phase. The control stage ST corrects the position of the shift register until the received text and the test text generated in the receiver are in phase. The control stage then releases the measurement when the phase adjustment is completed.

With a block length which is to be smaller than the maximum cycle of the test text, the switch S lies in position 1. Thereby, the step time signal T is routed to the adjustable counter Z. With a counting capacity of, for example, $2^m$, block lengths of $2^m$ arise. With a block length, which is to be greater than the maximum cycle of the test text, the switch S lies in position 2. The counter receives a counting impulse, in any given case, at the end of the maximum cycle of the generated test text. The counting impulses are routed to the counter at an interval in time $Ts=Tx(2^n-1)$. Ts is the interval in time between two counting impulses; T is the interval in time between two step timing impulses; n is the number of shift register stages.

With a counter capacity of $k$, there results a block length of $2^k \times (2^n-1)$ bits. The binary counter then gives off impulses at the output spaced apart by a distance of the desired block length. The output impulses of the counter switch a switching device, for example, a bistable trigger stage K, to the measurement position E. If, in this condition, an error impulse which is given off by the comparator, when the two compared binary steps do not agree, reaches the gate G, then there appears at the output, an impulse which is routed to the error counter FZ. The error counter counts the number of the impulses arising at the output of the gate G. However, the error impulse simultaneously switches the trigger stage K to the rest position A, so that the gate remains blocked for further error impulses, until the binary counter Z again switches the trigger stage K to the measurement position through a further output impulse. Thus, the error counter counts in each set block a maximum of one error impulse. Through the selection of the counter capacity of the counter Z, the block length can be differently set.

The measurement of the frequency of block errors take place independent of the selected block length always with whole number multiples of a maximum cycle of $2^n-1$. Thus, the measurement always ends with a maximum cycle end. Because a maximum cycle length of $2^n-1$ bits is not divisible by a block length of, for example, $2^m$ bits, the minimum number of the bits to be evaluated in a measurement will be $B\text{min} = 2^m \times (2^n-1)$ bits. The measurement of the frequency of block errors is completed at the correct point in time by the control stage, in that, the end of the measurement is determined through a coincidence of block ends and maximum cycle ends.

Figure 2:
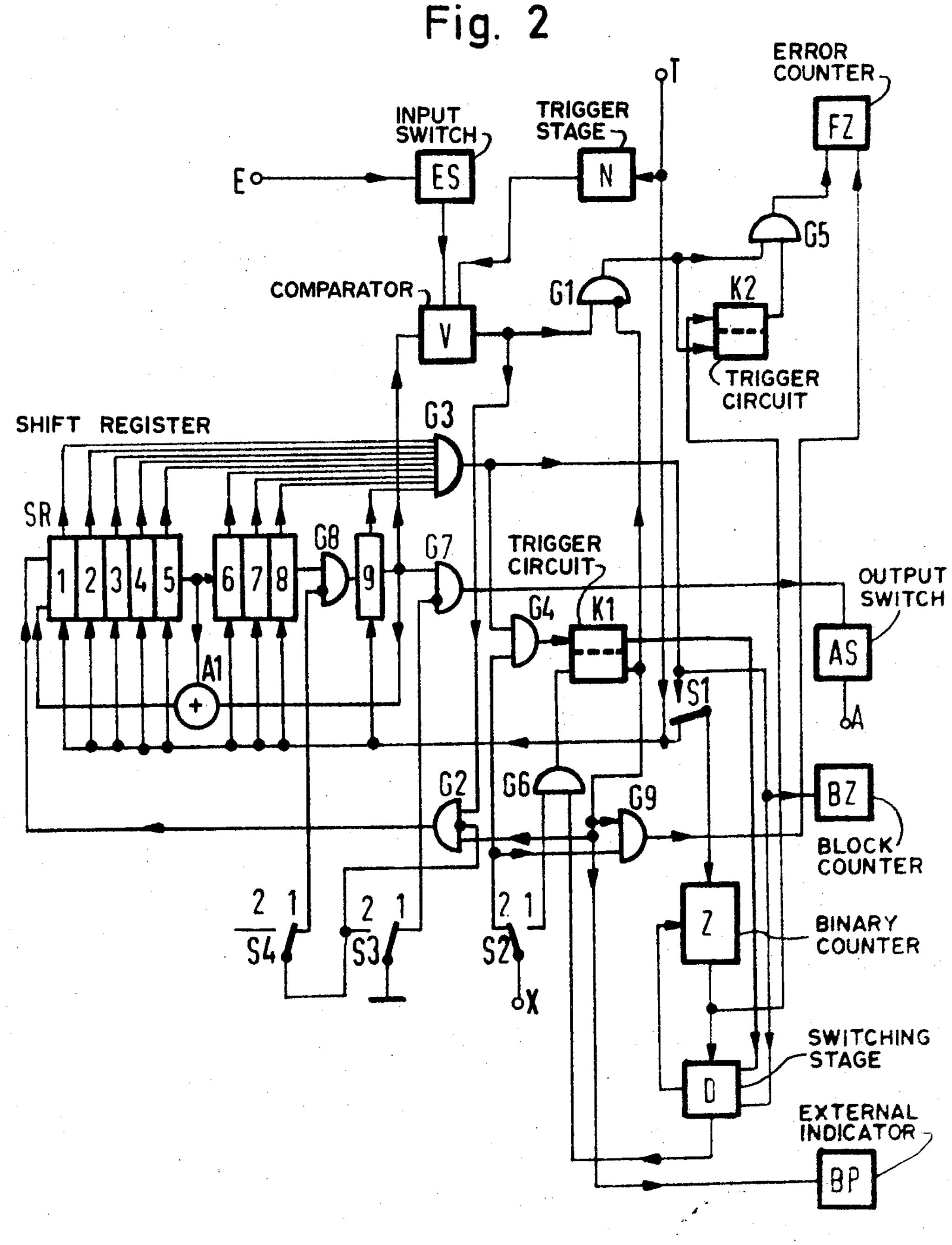
FIG. 2 is a diagram of a preferred circuit arrangement constructed according to the principles of the invention.

FIG. 2 shows a preferred embodiment of a bit and block error frequency measuring device constructed according to the principles of the invention. The shift register SR has nine stages (1 through 9), so that a maximum cycle length of $2^n-1 = 511$ bits results. The feedback in the shift register is effected over an adder A1. The shift register gives off a fixed binary series of steps at the output. The binary steps in the shift register are advanced therethrough in step timing, which is applied to input T and which originates from a count-stabilized oscillator built into the measuring apparatus or is taken from an outside timing source. The binary character series of the shift register is routed by the stage 9 to the comparator V. The received binary character series of the test text is applied to another input of the comparator V over the input switch ES. The input switch ES increases the slope of the edges of the received characters applied to the input E.

In an error free transmission the text sent out from the sender corresponds to the text generated by the shift register SR. Before the beginning of the block error frequency measurement, it is necessary that the correct block phase is achieved. For this purpose, the shift register receives at the beginning a known base position. In the rest condition, the shift register is fixedly adjusted to a certain combination, which lies 20 bits before the end of the test text. At the beginning of the measurement, the relationship between the sending and the receiving shift registers must first be produced. In the comparator V, the bit lying at the output of the last shift register stage is compared with the received bit in the middle of the step. With the help of the logical stage N, for example, a trigger stage, the step time signal is displaced in phase by 180° so that scanning impulses are applied to the comparator in the middle of the step. In case of disagreement, between the compared steps, the shift register remains in its rest position. However, the error is not indicated, because the gate G1 is blocked by the trigger circuit K1. If the comparison results in the agreement of the two bits, then the shift register is advanced by one step and the next bit is compared. With each error, the shift register is reset to the base position through the gate G2.

Only when 20 bits successively agree, is the measurement of the error frequency begun. All of the shift register stages are then in the binary condition "1." Therewith, the gate G3 gives off an impulse which controls the trigger stake K1 from the rest position to the work position over the gate G4, which has been prepared over the switch S2. The switch S2 is found in position 2 and gives off the preparation voltage which is applied through the terminal X to the gate G4. The trigger circuit K1 releases the gate G1, so that the error impulse given off from the comparator arrives over the gates G1 and G5 at the error counting device. The number given by the error counter corresponds to the number of bits falsified in the transmission. A comparison with the total number of transmitted bits yields the bit error frequency.

In the working position, the trigger circuit K1 blocks gate G2 so that the shift register is no longer reset to the base position by an error impulse. The shift register runs freely whereby the shift register of the sender and that of the receiver are in synchronism. The determination of the block phase and therewith, the beginning of the measurement is indicated externally in a device BP through the lighting of a lamp for the correct block phase. At the end of the error frequency measurement, the switch S2 is placed in position 1 preparing AND gate 6 for production of an output. At the end of the test text, the shift register gives off an impulse over the gate G3, which impulse arrives over the switching stage D at the gate G6 and controls the trigger circuit K1 to the rest position. Thereby, the indication of errors over the gate G1 is suppressed, and the shift register SR is reset to the base position over the gate G2.

For the measurement of a block error frequency, the binary counter Z is initially adjusted to a certain block length, which block lengths are graduated in powers of 2. When the block length is smaller than the cycle length of the test text, the switch S1 is positioned to receive the step time signal T. If, however, the block length is to amount to a multiple of the cycle length of the test text, then the switch S1 is positioned on the output of the gate G3. In the latter case, the counter Z receives, in any given case, a counter impulse at the end of the test text. The error impulse from the comparator V must traverse the gate G5 before it switches the error counter FZ further. This gate is blocked after every error impulse from the trigger circuit K2, which is reset again to the rest position by the counter Z upon reaching a predetermined value for the block length. Impulses which control the trigger circuit K2 to the work position, in which the gate G5 is prepared, appear at the output of the counter Z at an interval of the desired block length. Thereby, it is guaranteed that only one error impulse can reach the error counter FZ during the set block length.

The error frequency measurement is always completed with the end of the test text of the shift register, independent of the presently set block length.

The switching stage D emits a control signal at the coincidence of the impulse given off by the gate G3, at the end of the test text, with the impulse emitted by the counter Z upon reaching the predetermined block length. The latter control signal controls the trigger circuit K1 to the rest position over the gate G6. This completes the error frequency measurement. The error frequency as a quotient of erroneous information to the total transmitted information segments cannot be directly indicated. It is, therefore, necessary that in addition to the number of errors, the number of blocks is also counted in the block counter BZ. Conventional numeral indicating tubes are advantageously utilized for the counting.

The generation of the $2^n-1$ bit test text makes possible transmission path measurements with the data receiver. In addition, one to one changes and permanent polarities can also be transmitted. With the transmission of the test text, the shift register SR is free running. The switch S3 is placed in position 2 from position 1 where it was placed for measurements of the error frequency. The switch S3 releases the gate G7 in the sending station, so that the output switch AS transmits the test text from the output A. For the sending of one to one changes, the last stage, stage 9, of the shift register SR is separated from the previous stages through the gate G8. By this means, the stage divides the controlling step time signal. The switch S4 is moved to position 1 from position 2, where it was placed for transmission of the test text. Because the switch S2 is at position 2 in sender operation, the error counter is reset to the rest position over the gate G9 and is fixedly held there until the beginning of a new error frequency measurement. Because the process in accordance with the invention is used to send the test text as well as for the measurement of error frequency, a transmission path measurement is possible with two of the circuit arrangements constructed in accordance with the invention.

We claim:

1. A method for measuring block error rates in systems transmitting binary coded data characters wherein a block test text signal of predetermined duration having a predetermined number of bits is transmitted from a sending station and error measurement occurs in a receiving station, comprising the steps of:
generation of a comparison signal corresponding to said test text signal in said receiver station,
adjusting said comparison signal to be in phase with said test text signal transmitted from said sending station,
comparing on a bit by bit basis the said test text signal with said comparison signal,
producing an error signal for each error noted in said comparing step,
gating said error signals to an output for use in indicating an error measurement,
setting a block signal length of a desired duration,
timing said gating step so that no more than one error signal appears at said output for one block signal length, as set in said setting step, and
counting the number of error signals appearing at said output during a predetermined period of time.

2. The method defined in claim 1 wherein said generating step is accomplished using a shift register and comprising the additional steps of:
setting said shift register to a predetermined base position prior to said adjusting step,
resetting said shift register to said base position responsive to each error signal resulting from each said comparison, and
preventing the return of said shift register to said base position upon the arrival of the end of said test text.

3. Apparatus for measuring block error rates in a receiving station of a binary coded data transmission system wherein a block test text signal having a predetermined number of bits is transmitted from a sending station to said receiving station, comprising:
shift register means for generating a comparison signal having a predetermined text cycle length,
timing means for controlling the switching operation of said shift register,
synchronizing means for adjusting said comparison signal to be in phase with said test text signal,
comparator means for comparing corresponding individual bits of said test text signal and said comparison signal and for producing an error signal upon determining a difference between said compared signals,
first counter means, adjustable to have a maximum count corresponding to a desired block length,
switching means for connecting said timing means to said counter means when said desired block length is of smaller duration than said text cycle length and for connecting an output from said shift register means to said counter means when said desired block length is of a duration greater than said text cycle length,
said shift register delivering a pulse after each text cycle length,
control means connected to said shift register means, said comparator means and said first counter means for, upon the completion of operation of said synchronizing means, establishing the exact starting and stopping times of the measuring operation,
gating means for controlling the coupling of said error signal to an output terminal under the control of said first counter means, said gating means being open for the passage of an error signal only once during the desired maximum count period of said first counting means and
second counter means for counting the error signals appearing at said output terminal.

4. The apparatus defined in claim 2 wherein said shift register means includes adjustment means for adjusting said shift register to a predetermined base position and reset means for resetting said shift register to said base position responsive to each said error signal.

* * * * *